United States Patent [19]

Whipple

[11] Patent Number: 4,546,820
[45] Date of Patent: Oct. 15, 1985

[54] METHOD AND APPARATUS FOR FORMING HEAT EXCHANGER ASSEMBLIES WITH BENDABLE TUBE SHEET FLANGES

[75] Inventor: Charles E. Whipple, Brewerton, N.Y.

[73] Assignee: Carrier Corporation, Syracuse, N.Y.

[21] Appl. No.: 481,189

[22] Filed: Apr. 1, 1983

[51] Int. Cl.⁴ .............................................. F25D 21/14
[52] U.S. Cl. .......................................... 165/77; 62/285
[58] Field of Search ................... 165/77; 62/285, 291

[56] References Cited

U.S. PATENT DOCUMENTS

| | | | |
|---|---|---|---|
| 2,886,956 | 5/1959 | Loveley | 62/285 |
| 3,000,193 | 9/1961 | Crider | 62/285 |
| 3,097,507 | 7/1963 | Makuh | 165/77 X |
| 3,451,226 | 6/1969 | Shriver | 62/285 |
| 4,000,779 | 1/1977 | Irwin | 62/285 X |

Primary Examiner—William R. Cline
Assistant Examiner—Peggy A. Neils
Attorney, Agent, or Firm—Robert H. Kelly

[57] ABSTRACT

A method and apparatus for forming heat exchanger assemblies with bendable tube sheet flanges is disclosed. A single tube sheet having a bending slot defined thereby and including a connecting portion for joining two portions of the tube sheet is disclosed. Separate coil cores are formed in each portion of the tube sheet such that the tube sheet may be bent to one configuration for allowing simultaneous soldering of the two coil cores in a side by side relationship. Thereafter, the tube sheet may be bent in an opposite direction to secure the ends of the coil cores together to help form an inverted V-shaped heat exchanger assembly.

3 Claims, 5 Drawing Figures

METHOD AND APPARATUS FOR FORMING HEAT EXCHANGER ASSEMBLIES WITH BENDABLE TUBE SHEET FLANGES

BACKGROUND OF THE INVENTION

1. Field of the Invention

The present invention relates to heat exchanger assemblies arranged in a specific configuration. More particularly, the present invention concerns apparatus and a method for assembling a heat exchanger in an inverted V-shaped configuration.

2. Prior Art

Air conditioning units as are typically used for conditioning a residence include split system components. In a split system, an outdoor condensing unit is typically mounted exterior of the residence in communication with outdoor ambient air and includes the heat exchanger serving as a condenser and the compressor. An indoor heat exchanger is mounted within the residence in the air flow stream of the air being circulated within the enclosure. This indoor heat exchanger is typically the evaporator of the air conditioning system.

It has been found advantageous to angle the heat exchanger serving as an evaporator to the air flow stream such that the desired amount of face area of the evaporator is presented to the air being circulated thereover. A single coil core may be angled across the entire air flow stream. Typically, a fan is additionally provided for circulating air from the enclosure through the indoor heat exchanger and back to the enclosure.

One of the specific configurations found highly acceptable for use as an indoor heat exchanger is an inverted V-shaped coil arrangement otherwise known as an A coil. In the inverted V-shape, two coil cores are positioned to be inclined to the air flow stream and to meet at the center of the air flow stream and extend downwardly and outwardly therefrom. Air may then flow upwardly through the coil cores and outwardly such that the air flows through the two coil cores in the inverted V-shaped arrangement. This arrangement is particularly advantageous because the face area of the two coil cores is larger than the cross-sectional area of the air flow stream. Additionally, by providing shorter angled coil cores, the air pressure drop of the air being circulated therethrough is decreased. Finally, by providing shorter inclined coil cores, the potential for condensate collecting on the heat exchange surface and dripping from the heat exchange surface downwardly into a fan or into a furnace is reduced since the water flow path along the heat exchange surface to the condensate collection area is reduced in length in an inverted V-shaped configuration.

One of the methods of assembling an indoor heat exchanger includes mounting a plurality of parallel plate fins, each defining openings, to form a fin bundle. Tube sheets are then placed at each end of the fin bundle and hairpin tubes are inserted through the openings of the tube sheets and the fin bundle to form a portion of a refrigerant flow path therethrough. The open end of the hairpin tube extending beyond the tube sheet is belled outwardly and return bends, U-shaped connecting pieces, are joined to the belled ends of the hairpin tubes to form appropriate connections to define a refrigerant flow path through the heat exchanger. The return bends are typically soldered to the hairpin tubes to complete the circuit. Special soldering processes are required if the heat exchanger materials are all aluminum.

One of the special processes utilized is to immerse the return bends and bell ends to be soldered into a molten solder bath and to apply ultrasonic energy whereby the return bend is bonded to the hairpin tube via this ultrasonic soldering process. Each of the two coil cores making up the inverted V-shaped assembly must be immersed in the solder bath and soldered. Since it is awkward and requires solder pots larger than presently available to solder the two coil cores in the inverted V-shaped configuration, heretofore the coil cores have been soldered separately and then assembled to form the desired heat exchanger.

The present invention concerns providing a single tube sheet having separate areas of spaced openings to receive the hairpin tubes cooperating with the fin bundles to define two separate coil cores. Each tube sheet defines a bending slot which extends across the face of the tube sheet but not across a coacting flange such that the remaining flange connecting portions serve as both a pivot point for allowing bending to change the configuration of the two coil cores relative to each other but also serve to maintain the two heat exchangers in the appropriate configuration. To effect soldering, the two coil cores are placed into a parallel side by side relationship such that the connecting portions are bent to form a 180° angle. The two coil cores are then soldered simultaneously by immersing both of them in the solder pot while they are maintained in a parallel side by side relationship. Thereafter, the two coil cores are removed from the solder pot and displaced relative to each other to partially unbend the flange connecting portions to form the desired inverted V-shaped configuration.

SUMMARY OF THE INVENTION

An object of the present invention is to provide a method of assembling a heat exchanger.

Another object of the present invention is to provide an inverted V-shaped heat exchanger assembly.

A further object of the present invention is to provide a heat exchanger assembly having two separate coil cores which may be soldered simultaneously in a parallel side by side relationship and thereafter displaced to form an inverted V-shaped configuration without requiring additional hardware, fixturing or other connecting devices.

Another object of the present invention is to provide a safe, economical and reliable apparatus and method for manufacturing an inverted V-shaped heat exchanger.

Other objects will be apparent from the description to follow and the appended claims.

The preceeding objects are achieved according to the preferred embodiment of the invention by the provision of a heat exchanger assembly which comprises a first tube sheet including a face portion defining circular openings therein and including at least one first flange angled from the tube sheet face, said tube sheet defining a first bending slot extending across the face of the tube sheet but not across the flange leaving a first flange connecting portion. A pair of fin bundles formed from numerous parallel fins each defining openings which are arranged in registration with the openings of the first tube sheet and a second tube sheet also defining openings in registration with the openings in the fin bundles are additionally provided. Hairpin tubes are located to extend through the second tube sheet, the fin bundles and the first tube sheet to collectively form coil cores. One coil core is located such that the hairpin tubes extend through the first tube sheet on one side of the first bending slot and the hairpin tubes of the other coil core extend through the first tube sheet on the opposite side of the first bending slot. Hence, the two coil cores may be displaced relative to each other by bending the first tube sheet at the first flange connecting portion. Both tube sheets may include a bending portion and the bending portion may be utilized to allow the heat exchangers to be placed in one configuration for soldering and the separate inverted V configuration for application to the desired environment.

DESCRIPTION OF THE PREFERRED EMBODIMENT

The embodiment described below is for use as the indoor coil of an air conditioning system as may be used to cool a residence. It is to be understood that this invention has like applicability to heat pumps as well as straight cooling systems and to heat exchangers other than those used in air conditioning systems. It is additionally to be understood that this invention is not limited to residential sized equipment but may be utilized in smaller or larger heat exchange applications.

Figure 1:
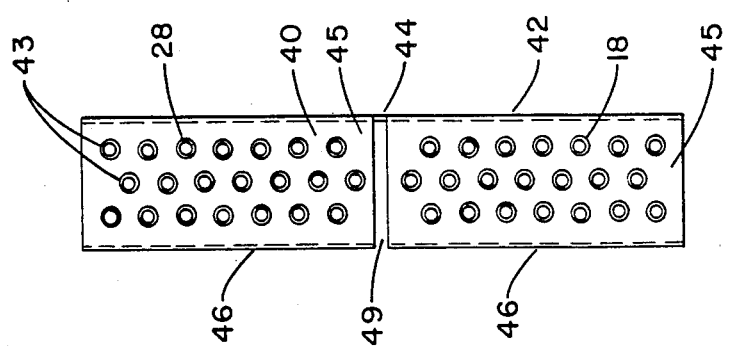
FIG. 1 is an end view of a tube sheet showing the bending slot.

Referring now to FIG. 1 there may be seen an end view showing tube sheet 40 having openings 43 arranged in two areas extending therethrough. Tube sheet 40 additionally has a face portion 45 and perpendicular thereto both flange 46 and flange 42. These flanges, as viewed in FIG. 1, extend downwardly into the paper. Additionally, there may be seen belled ends 28 and 18 of hairpin tubes extending through openings 43 in the tube sheet face 45. Between the two areas defining the openings for receiving the hairpin tubes may be seen bending slot 49 which is defined by the tube sheet. The bending slot cuts across flange 46 and across the tube sheet face 45 leaving only connecting portion 44 of flange 42 remaining. This connecting portion serves as a pivot point and acts to hold the two portions of the tube sheet together.

Figure 2:
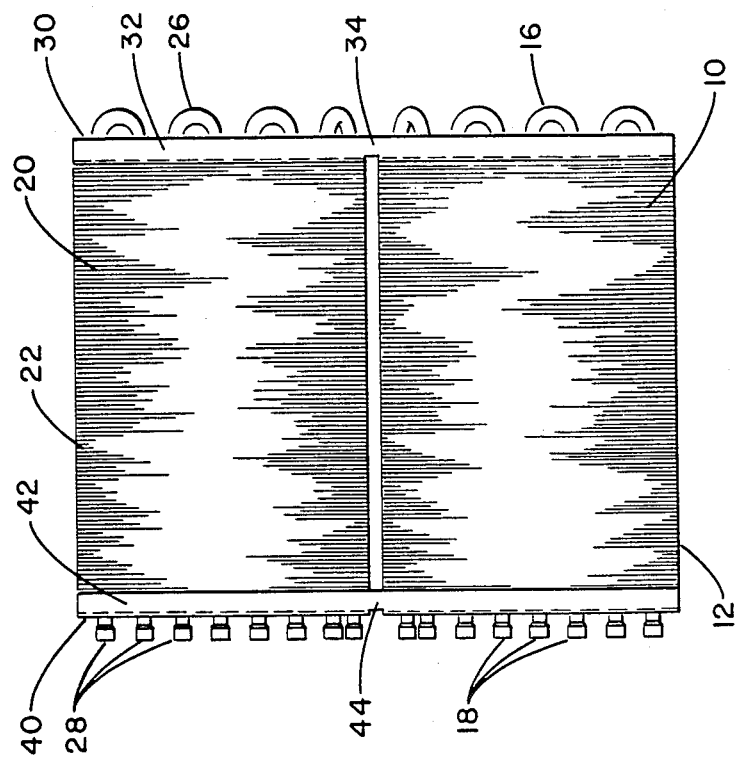
FIG. 2 is a side view of two coil cores assembled to the tube sheets.

FIG. 2 is a side view of the same assembly as shown in FIG. 1. In FIG. 2 it can be seen that coil core 10 having fins 12 and coil core 20 having fins 22 are mounted to tube sheet 40. Tube sheet 30 is shown located at one end of the fin bundle formed by fins 12 or the fin bundle formed by fins 22 and additionally includes a flange 32 having connecting portion 34. Tube sheet 40 is located at the opposite end of the two fin bundles and additionally includes a tube sheet flange 42 extending inwardly covering some of the fins and including a connecting portion 44 joining the flange between the two fin bundles. The belled ends of the hairpin tubes 18 and 28 are shown extending beyond the end of tube sheet 40. The U-bend end of the hairpin tubes 16 and 26 is shown extending beyond the other end of tube sheet 30. The hairpin tubes are tubes having U-shaped ends and long legs such that a complete circuit back and forth through the fin bundle is formed by inserting each hairpin tube through tube sheet 30, through fins 22 and through tube sheet 40.

Figure 3:
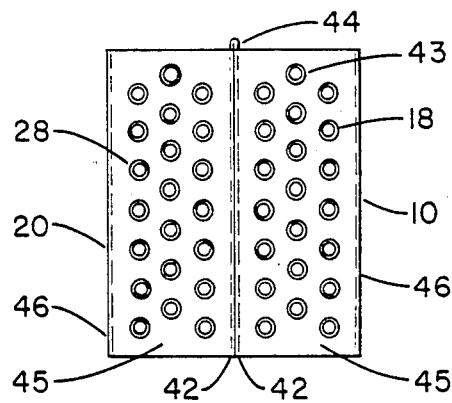
FIG. 3 is an end view of the tube sheet placed in a position where the coil cores are arranged in a parallel side by side relationship.

FIG. 3 is an end view similar to FIG. 1 showing the tube sheet in the bent position. It can be seen that the face portion 45 of the tube sheet defines openings 43 through which belled ends 18 and 28 of the hairpin tubes extend. Flange 42 and 46 of the tube sheet are shown. Connecting portion 44 is shown being a part of flange 42 extending upwardly beyond the end of face portion 45 of the tube sheet at the top. Hence, as can be seen in FIG. 3, coil core 10 and coil core 20 are both arranged in a parallel side by side relationship with all the belled ends of the hairpin tubes extending in the same direction.

Figure 4:
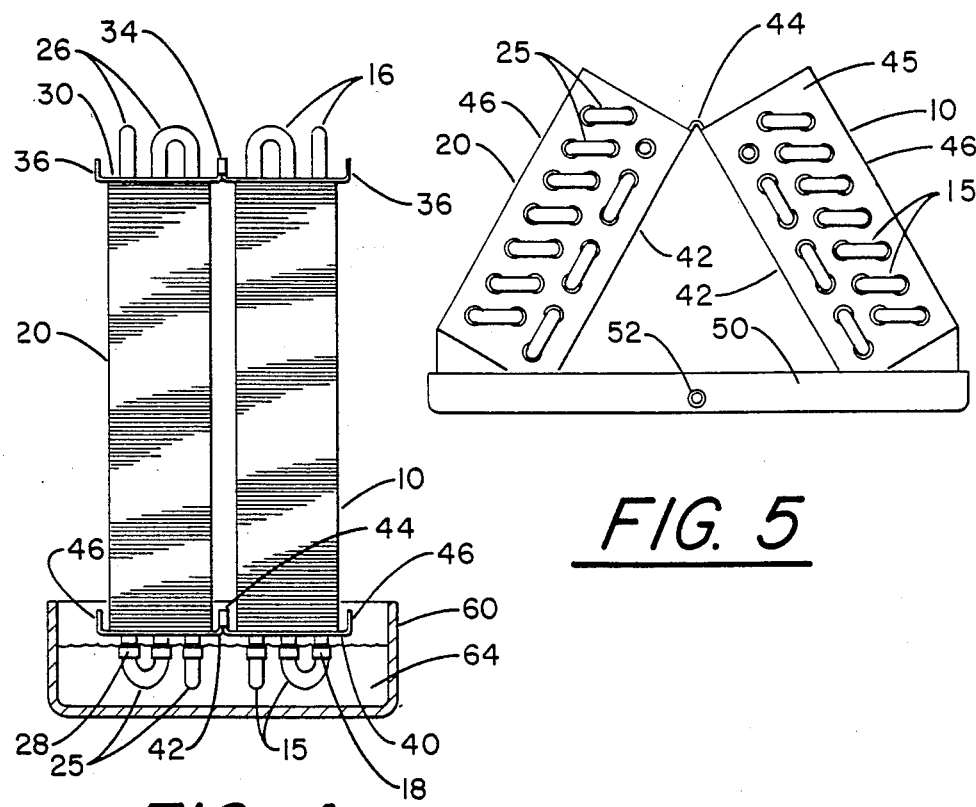
FIG. 4 is a side view of the heat exchanger assembly as shown in FIG. 3 and showing the return bends and the hairpin tubes immersed in a solder bath.

In FIG. 4, the coil cores 10 and 20 are shown in a parallel side by side relationship. Return bends 15 and 25 are shown inserted into belled ends 18 and 28 of the hairpin tubes to complete the circuiting forming the refrigerant flow paths through the coil cores. Tube sheet 30 is shown located at the top of the coil and includes flanges 36 and connecting portion 34 joining the two coil cores. Hairpin tubes 16 and 26 are also referenced.

At the opposite end of the assembly there may be seen tube sheet 40 having flanges 46 located at the exterior sides and flange 42 located at the center including connecting portion 44. The two coil cores are shown being immersed within solder pot 60 having a liquid bath of molten solder 64. The two coil cores are immersed until the joints to be joined are completely immersed in the solder bath. The coil cores remain in a solder bath for a predetermined length of time during which ultrasonic energy is applied to the solder bath.

Figure 5:
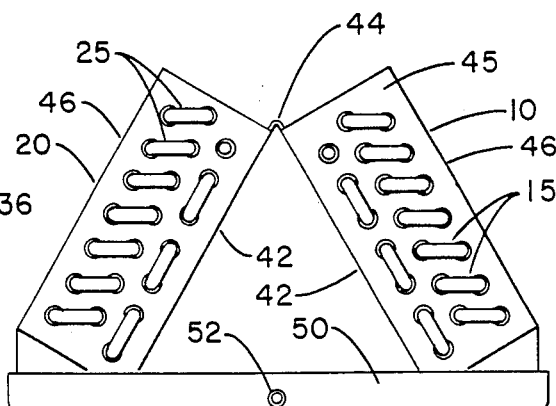
FIG. 5 is an end view of the heat exchanger assembly shown in an inverted V-shaped configuration and located in a condensate pan.

FIG. 5 discloses a view similar to FIG. 3 wherein the tube sheets are bent into an inverted V-shaped configuration. In FIG. 5, drain pan 50, including drain 52 is shown forming a base to which the inverted V-shaped heat exchanger may be mounted. Coil cores 20 and 10 are shown having one end displaced relative to the other such that the bottom portions of the two coil cores are displaced from each other. The top ends of the two coil cores are still connected via connecting portion 44 of tube sheet 40. Flanges 42 and 46 of the tube sheets as well as the face portion 45 of the tube sheets are shown. Return bends 15 and 25 are shown connecting the appropriate belled ends of the hairpin tubes in each heat exchanger.

A typical plate fin heat exchanger is manufactured by assembling a plurality of parallel plate fins defining tube receiving openings in registration. Tube sheets are then located at each end and the hairpin tubes are inserted through one tube sheet through the fin bundle and then through the opposite tube sheet. A mechanical or hydraulic means is then utilized to expand the legs of the hairpin tubes outwardly to form a metal to metal contact with the openings in the fins to promote heat transfer therebetween. Thereafter or simultaneously therewith, the ends of the hairpin tubes extending beyond the tube sheet are belled outwardly to promote the receipt of return bends. Return bends are then mechanically inserted into the belled ends of the hairpin tubes. To form a leakproof circuit the return bends are then soldered or otherwise bonded to the hairpin tubes. Utilizing aluminum material it has been found that soldering in a molten solder bath excited by ultrasonic energy is the most effective way to achieve said bonding.

This ultrasonic soldering is accomplished by immersing the appropriate ends of the coil core with the parts to be soldered in a molten solder bath. By utilization of the present tube sheet having the bending slot such that the coil cores may be placed in a parallel side by side relation, the two coil cores making up a single inverted V-shaped heat exchanger assembly may be soldered simultaneously by immersing them in the parallel side by side relationship into the solder pot. Thereafter, these same two coil cores may be utilized to form an inverted V-shaped heat exchanger by unbending the two coil cores relative to each other to achieve the inverted V-shaped configuration as shown in FIG. 5.

Hence, the utilization of this tube sheet having a bending slot 49 and connecting portion 44 not only serves to provide a system for maintaining coil cores to be soldered in a parallel side by side relationship for soldering but additionally serves to secure one end of the coil cores together in an inverted V-shaped configuration as may be desired. The same tube sheet design may be utilized on both tube sheets of the coil cores to obtain the desired effect. In addition to the above, a clamping arrangement may additionally hold the two coil cores in a side by side relationship for soldering. This clamping arrangement may be part of the production equipment utilized to immerse the coil cores in the solder bath.

The apparatus has been described herein with reference to a particular embodiment. However, it is to be understood by those skilled in the art that variations and modifications can be effected within the spirit and scope of the invention.

What is claimed is:

1. A heat exchanger assembly which comprises:
    a first tube sheet including a face portion defining circular openings therein and including at least one first flange angled from and extending along a longitudinal side of the face portion of said entire first tube sheet, said tube sheet defining a first variable bending slot extending transversely across the face portion of the first tube sheet forming a first tube sheet portion and a second tube sheet portion but not across the first flange leaving a first pivotal flange connecting portion;
    a pair of fin bundles formed from numerous parallel fins each defining openings which are arranged in registration with the openings in the first tube sheet;
    a second tube sheet also defining openings in a face portion in registration with the openings in the fin bundles, said second tube sheet in parallel spaced relation to said pair of fin bundles and said first tube sheet, said second tube sheet comprises a second flange angled from and extending along a longitudinal side of the second tube sheet face parallel to said first flange and a second variable bending slot extending across the second face portion but not across the second flange leaving a second pivotal flange connecting portion;
    hairpin tubes extending through the second tube sheet, the fin bundles and the first tube sheet to form two coil cores,
    wherein one coil core is located such that the hairpin tubes extend through the first tube sheet portion on one side of the first variable bending slot and the hairpin tubes of the other coil core extend through the second tube sheet portion of the first tube sheet on the opposite side of the first variable bending slot whereby the two coil cores may be displaced relative to each other from an in-line position to a parallel side-by-side position by bending the first tube sheet at the first pivotal flange connecting portion and the second tube sheet at the second pivotal flange connecting portion.

2. The apparatus as set forth in claim 1 wherein each of the first tube sheet and the second tube sheet further respectively comprise an additional first tube sheet flange and an additional second tube sheet flange, and wherein the bending slot in each extends across the additional first tube sheet flange and the additional second tube sheet flange.

3. The apparatus as set forth in claim 2 and further comprising a condensate pan to which the two coil cores are mounted, the coil cores being maintained in an inverted V-shaped configuration by the condensate pan and the first and second pivotal flange connecting portions of the tube sheets.

* * * * *